United States Patent
Gerhart et al.

(10) Patent No.: US 12,277,046 B2
(45) Date of Patent: Apr. 15, 2025

(54) SYSTEM AND METHOD FOR MONITORING STATE AND ALERTS IN DATA PROCESSING SYSTEMS

(71) Applicant: Dell Products L.P., Round Rock, TX (US)

(72) Inventors: Donald W. Gerhart, Leander, TX (US); Balamurugan Gnanasambandam, Bengaluru (IN); Randy Alton Frazier, New Braunfels, TX (US); Curtis Ray Genz, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 449 days.

(21) Appl. No.: 18/047,819

(22) Filed: Oct. 19, 2022

(65) Prior Publication Data
US 2024/0134767 A1    Apr. 25, 2024
US 2024/0232036 A9    Jul. 11, 2024

(51) Int. Cl.
*G06F 11/30* (2006.01)
*G06F 11/14* (2006.01)
*G06F 11/32* (2006.01)

(52) U.S. Cl.
CPC ...... *G06F 11/3058* (2013.01); *G06F 11/1417* (2013.01); *G06F 11/327* (2013.01)

(58) Field of Classification Search
CPC . G06F 11/3058; G06F 11/1417; G06F 11/327
USPC ...................................................... 700/300
See application file for complete search history.

(56) References Cited

U.S. PATENT DOCUMENTS

| | | |
|---|---|---|
| 6,389,817 B1 | 5/2002 | Smith |
| 7,698,095 B2 | 4/2010 | Chung et al. |
| 8,550,702 B2 | 10/2013 | Campbell et al. |
| 9,581,985 B2 | 2/2017 | Walser et al. |
| 9,772,664 B1 | 9/2017 | Chou et al. |
| 9,785,208 B2 | 10/2017 | Lovicott et al. |
| 9,820,411 B2 | 11/2017 | Alshinnawi et al. |
| 9,842,003 B2 | 12/2017 | Rao et al. |
| 9,968,011 B2 | 5/2018 | Shabbir et al. |
| 10,156,987 B1 | 12/2018 | Gutierrez et al. |
| 10,191,523 B2 | 1/2019 | Shows et al. |
| 10,394,294 B2 | 8/2019 | Pfeifer et al. |
| 10,712,033 B2 | 7/2020 | Atchison et al. |
| 10,760,809 B2 | 9/2020 | Gillette et al. |
| 11,009,249 B2 | 5/2021 | Goel et al. |

(Continued)

*Primary Examiner* — Michael J Brown
(74) *Attorney, Agent, or Firm* — WOMBLE BOND DICKINSON (US) LLP

(57) ABSTRACT

Methods and systems for managing the operation of data processing systems are disclosed. A data processing system may include a computing device that may provide computer implemented services. To provide the computer implemented services, hardware components of the data processing system may need to operate in predetermined manners. To manage the operation of the hardware components, the data processing system may implement a framework for improving the likelihood that the management components have access to consistent state information. The framework may include use of multiple management components that conserve and/or distribute information regarding the states of and events impacting the operation of hardware components.

20 Claims, 6 Drawing Sheets

(56) References Cited

U.S. PATENT DOCUMENTS

| | | |
|---|---|---|
| 2002/0030239 A1 | 3/2002 | Der Ropp |
| 2009/0198387 A1 | 8/2009 | Lin |
| 2011/0296155 A1 | 12/2011 | Belady |
| 2012/0223666 A1 | 9/2012 | Huang |
| 2013/0015548 A1 | 1/2013 | Chen et al. |
| 2013/0138935 A1* | 5/2013 | Belady ............... H05K 7/20836 713/1 |
| 2014/0027435 A1 | 1/2014 | Chou |
| 2015/0373876 A1 | 12/2015 | Berke |
| 2020/0042056 A1 | 2/2020 | Shabbir |
| 2020/0097055 A1 | 3/2020 | Wang |
| 2022/0413573 A1 | 12/2022 | Chiu |
| 2023/0086310 A1 | 3/2023 | Utz |
| 2023/0260864 A1 | 8/2023 | Kondapuram |
| 2024/0004749 A1* | 1/2024 | Zhang ................. G06F 11/3058 |

* cited by examiner

SYSTEM AND METHOD FOR MONITORING STATE AND ALERTS IN DATA PROCESSING SYSTEMS

FIELD OF THE EMBODIMENTS

Embodiments disclosed herein relate generally to device management. More particularly, embodiments disclosed herein relate to systems and methods to managing states of and/or events impacting components of devices.

BACKGROUND

Computing devices may store data and used stored data. For example, computing devices may utilize data when providing computer implemented services. If computing devices are unable to access data, process data, and/or perform other functions, then the computing devices may be unable to provide some, or all, of the computer implemented services desired by users of the computing devices.

BRIEF DESCRIPTION OF THE DRAWINGS

Embodiments are illustrated by way of example and not limitation in the figures of the accompanying drawings in which like references indicate similar elements.

DETAILED DESCRIPTION

Figure 1:
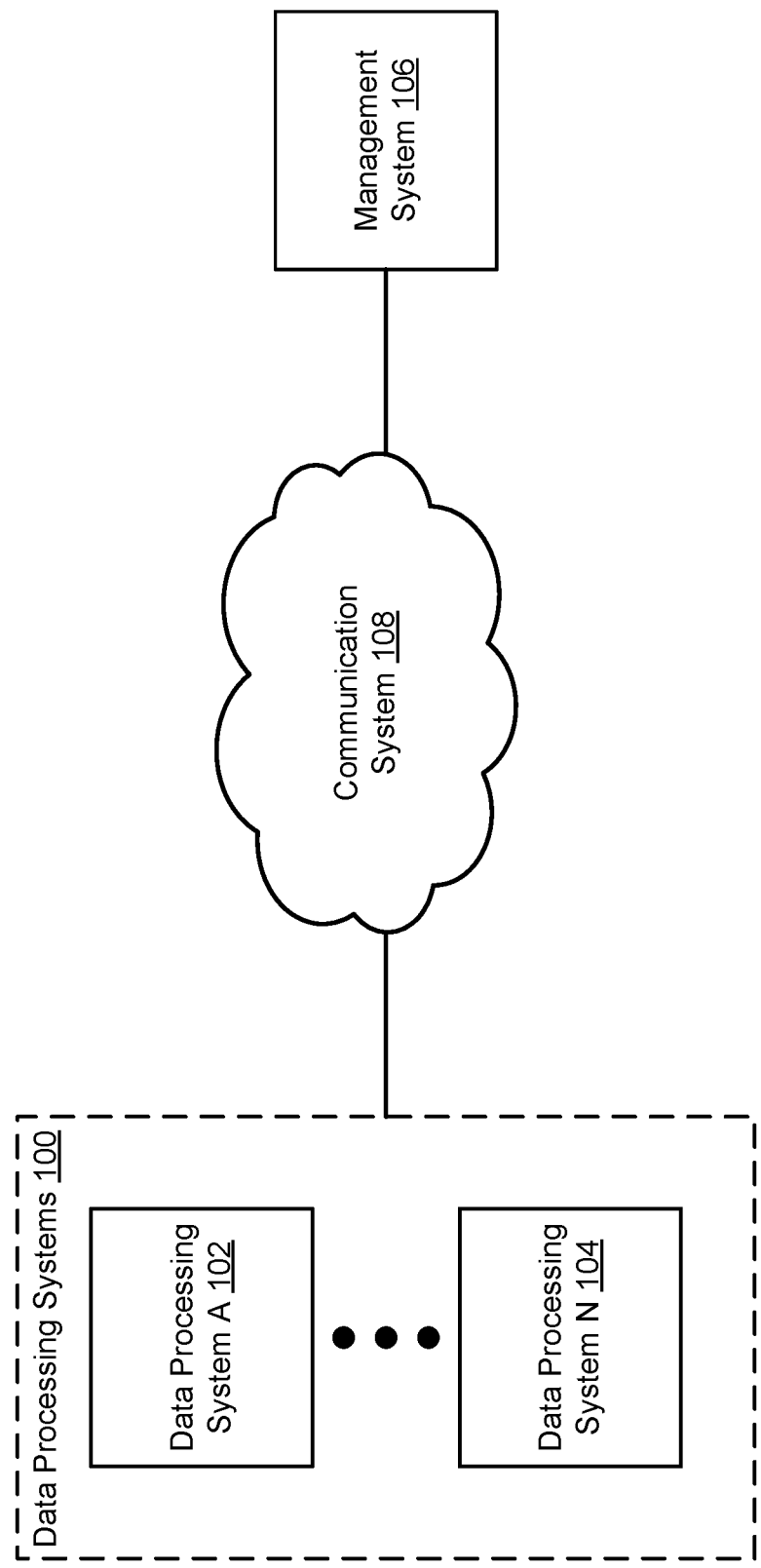
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References in the specification to "adapted to" may, in the context of a programmable device, indicate that the programmable device has been programmed to perform the functionality described with respect to the programmable devices. In the context of a static device, "adapted to" may indicate that the device include circuitry to perform the functionality described with respect to the static devices.

In general, embodiments disclosed herein relate to methods and systems for managing the operation of data processing system. A data processing system may include various hardware components that may be monitored to ascertain states of and/or events (e.g., alerts) impacting these hardware components.

Due to various limitations regarding the operation of the hardware components, some of the hardware components which may manage the operation of the data processing system may not operate at all points in time. To provide the hardware components (e.g., "management components") that manage the operation of the data processing system with a consistent view of the states of and/or events impacting the hardware components of the data processing system, the data processing system may implement a framework through which state/event information (e.g., regarding the states of and/or events impacting the hardware components) is conserved and distributed to the management components.

By doing so, the management components may be provided with a consistent view (e.g., information reflect the actual operation of the data processing system, and components thereof) of the data processing system. The consistent view may be used to drive downstream management processes such as, for example, selecting how to manage the operation of the data processing system, providing other entities with information regarding likely operation of the data processing system in the future, etc. Accordingly, the data processing system may be more likely to successful provide its computer implemented services in the future by taking proactive action to address issues likely to impact the data processing system.

For example, consider a scenario in which a management component tasked with managing operation of a data processing system is inoperable due to thermal limitations. The framework implemented by the data processing system may utilize other components to identify and maintain information regarding the operation of the data processing system while the management components is inoperable. Once the management component begins operation, the management component may obtain the information from the other components to update the view of data processing system available to the management component.

Thus, embodiments disclosed herein may provide a data processing system that is more likely to be able to provide desired computer implemented services through use of a consistent view of the operation of the data processing system by the management components tasked with managing the operation of the data processing system. Accordingly, embodiments disclosed herein may address, among others, the technical challenge of operational limitations of hardware components that may otherwise preclude them from access to information usable to make better data processing system management decisions.

In an embodiment, a data processing system that provides computer implemented services while operating is provided. The data processing system may include a temperature sensitive management controller to manage the data processing system, the temperature sensitive management controller having a thermal operating range having a lower temperature limit; a heater positioned to selectively warm the temperature sensitive management controller; a temperature sensor positioned to monitor a temperature of the temperature sensitive management controller; and a thermal manager adapted to: limit operation of the temperature sensitive management controller based on the lower temperature limit; and while limiting the operation, provide state tracking services for the temperature sensitive management controller.

Limiting the operation and providing the state tracking services may include identifying a startup of the data processing system; identifying, using the temperature sensor, the temperature of the temperature sensitive management controller during the startup; making a first determination regarding whether the temperature is below the lower temperature limit; in a first instance of the first determination where the temperature is below the lower temperature limit: initiating, using the heater, the selective warming of the temperature sensitive management controller; and making a second determination regarding whether the selective warming increased the temperature of the temperature sensitive management controller above the lower temperature limit.

Limiting the operation and providing the state tracking services may also include in a first instance of the second determination where the temperature of the temperature sensitive management controller is increased above the lower temperature limit: initiating operation of the temperature sensitive management controller during the startup.

Limiting the operation and providing the state tracking services may also include: in a second instance of the second determination where the temperature of the temperature sensitive management controller is not increased above the lower temperature limit: disallowing operation of the temperature sensitive management controller during the startup; and recording a heating failure state for the management controller.

Limiting the operation and providing the state tracking services may also include: in a second instance of the first determination where the temperature is above the lower temperature limit: initiate operation of the temperature sensitive management controller during the startup.

The temperature sensitive management controller may be adapted to, after initiating operation, communicate with the thermal manager to identify whether a failure of the heater occurred prior to the temperature sensitive management controller initiating operation, and in an instance of the communication where the temperature sensitive management controller identifies that the failure of the heater occurred: establish a log entry based on the failure of the heater that occurred.

The thermal manager may be adapted to operate at temperatures lower than the lower temperature limit.

The thermal manager may be further adapted to automatically begin to operate when the data processing system performs a startup, and the temperature sensitive management controller is restricted from beginning to operate unless directed to operate by the thermal manager.

The temperature sensitive management controller may be adapted to operate based on a state model, and the state model may include a state that is based on inoperability of temperature sensitive management controller.

The state may be further based on a failure of the heater to warm the temperature sensitive management controller.

In an embodiment, a computer-implemented method is provided. The computer-implemented may provide the functionality of the data processing system and/or components thereof, discussed above.

In an embodiment, a non-transitory media is provided. The non-transitory media may include instructions that when executed by a processor cause the computer-implemented method to be performed.

Turning to FIG. 1, a block diagram illustrating a system in accordance with an embodiment is shown. The system shown in FIG. 1 may provide any quantity and type of computer implemented services. To provide the computer implemented services, the system of FIG. 1 may include data processing systems 100.

All, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Data processing systems 100 may provide other types of computer implemented services without departing from embodiments disclosed herein. Data processing systems 100 may each provide similar and/or different computer implemented services, and any of data processing systems 100 may provide any of the computer implemented services in cooperation with other data processing systems and/or independently.

To provide computer implemented services, data processing systems 100 may need to operate in a predetermined manner. The predetermined manner of operation may include, for example, executing an operating system, drivers, and/or other type of management entities that mediate, facilitate, or otherwise operate in a manner which enables the applications to operate (e.g., by providing abstracted access to hardware resources used in the execution of the applications).

To operate in the predetermined manner, data processing systems 100 may perform one or more operations to enter the predetermined manner of operation (by changing from other manners of operation to the predetermined manner of operation). These operations may include, for example, a boot process from a power-on (or reset or other manner of operation that differs from the predetermined manner of operation to the extent that the applications may not be able to operate) to hand off operation management of the data processing system to an operating system or other type of operational management entity that places data processing systems 100 into the predetermined manner of operation. The operating system may, for example, provide abstracted access to resources (e.g., processing resources provided by processors, memory resource provided by memory modules, storage resources provided by storage devices, etc.) utilized by the applications hosted by the data processing system.

For example, consider a scenario where a data processing system has been shut off. After the data processing system is turned on, the data processing system may be operating in a startup manner such that the data processing system is not yet able to support execution of an application (e.g., the application may not be able to successfully execute until the data processing system hosts an operating system or other type of management entity). To enter the predetermine manner of operation conducive to execution of the application, the data processing system may go through a boot process (e.g., a startup) which may be performed by one or more types of management entity such as a basic input-output system and/or other startup management entities. The management entity may perform any number of actions (e.g., a "startup process") to prepare the data processing system to begin execution of an operating system and/or other type of management entity that facilitates execution of applications.

To perform the startup process and provide the computer implemented services, data processing systems 100 may include various hardware components (e.g., integrated circuit-based devices). The hardware components may perform various types of functionalities including, for example, (i) data processing functionality through which the computer implemented services may be provided, (ii) system management functionality through which the operation of the respective data processing systems may be managed, and/or (iii) other types of functionalities. The system management functionality may include, for example, monitoring the operating state of various components of the data processing system, identifying the occurrence of events that may impact the operation of the data processing system, attempting to modify the operation of various components (e.g., when identified as operating in an undesired manner), and/or otherwise managing the operation of a data processing system.

As part of the management process, information regarding the operation of the data processing system may be provided to management system 106. Management system 106 may be tasked with, for example, operating as a control plane or other type of management entity which may coordinate operation of any number of data processing systems.

However, if a hardware component of a data processing system is unable to perform its functionalities, then the data processing system may be unable to provide all or a portion of its functionality (e.g., some of the computer implemented services, self and/or cooperative management, etc.). For example, consider a scenario where a hardware component tasked with monitoring and correcting the operation of a data storage device (e.g., a system management functionality) of a data processing system becomes inoperable. If the data storage device fails to properly store data while the hardware component is inoperable, then data loss may occur because the hardware component may not timely correct the operation of the data storage device. The data loss may impair the computer implemented services.

In another example, consider a scenario where a hardware component tasked with managing a startup of a data processing system is inoperable during the startup. If a hardware components used in the startup fails to operate as expected, then the startup may fail and/or otherwise be impacted while the hardware component is unavailable. Consequently, the data processing system may be left in a state where it is unable to provide the computer implemented services, self/cooperatively manage itself, and/or my otherwise operate in undesirable manners.

Hardware components of data processing systems 100 may become inoperable for a variety of reasons. For example, any of the hardware components may have limited temperature ranges in which they may successfully operate. If the temperature of the hardware component falls below a lower temperature limit (e.g., of the operating temperature range), then the data processing system (or portions thereof) may prevent the hardware component from operating and/or the hardware component itself may prevent the hardware component from operating.

To diagnose and/or remediate issues impacting the operation of data processing systems 100, various information may be collected by management components of data processing system 100. The management information may include, for example, state information, event information, and/or other types of information. However, if the management components tasked with obtaining, storing, processing, and/or otherwise using this information are inoperable, then the information may not be available and may limit the ability of data processing systems 100 to be managed and/or otherwise operate as expected.

In general, embodiments disclosed herein relate to systems, devices, and methods for improving the likelihood that data processing systems 100 are able to provide their computer implemented services. To improve the likelihood that data processing systems 100 are able to provide their computer implemented services, data processing systems 100 implement a framework for obtaining, storing, processing, and/or otherwise using information regarding the state of and/or events that occur with respect to data processing systems 100. The framework may be resilient to inoperability of various hardware components through use of persistent state and/or event logging. By doing so, data processing systems 100 may be more likely to have access to more information usable to diagnose and remediate the operation of data processing systems 100.

To implement the framework, each of data processing systems 100 may include multiple hardware components that are able to persistently log events and states of data processing systems 100 while only some of the hardware components are operating. When inoperable components become operable, the newly operable components may check with other components to ascertain whether any persistently logged states and/or event information is available. By doing so, a consistent view of the states of and events impacting various hardware components may be maintained across the hardware components of each of data processing system 200.

To document the states of inoperable hardware components, the framework may include states that reflect the conditions leading to the inoperability of hardware components. For example, consider a scenario where a hardware components of a data processing system is temperature sensitive and is unable to operate below a lower temperature limit. If exposed to a cold ambient environment and the host data processing system is shut off, the hardware component may fall below the lower temperature limit thereby preventing it from operating until it is warmed.

To warm the hardware component, the data processing system may host a heater that may generate heat to warm the hardware components (and/or other hardware components) until the temperature of the hardware components is above (and maintain the temperature above) the lower temperature limit. Like all hardware components, the heater may fail thereby preventing the hardware component from being warmed.

However, if the ambient temperature rises after the heater failure (e.g., any condition that may prevent the heater from heating as expected when operating within specification), the temperature of the hardware component may rise thereby facilitating operation of the hardware component. When the hardware component begins to operate, it may not have any information regarding the events and its state while not operating. Consequently, important information (e.g., the heater failure/inability to be sufficiently heated for operation) regarding the hardware component may not be taken into account when managing the data processing system, particularly if the hardware component is a management component tasked with performing management functions that rely on such information being available.

To provide information regarding the operation of inoperable hardware components, the framework may include a state model that includes (i) a first state that reflects when a hardware component was successfully heated and then operated, (ii) a second state that reflects when a hardware component needs to be heated but is unsuccessfully heated, and/or (iii) a third state that reflects when heating of the hardware components is not needed for operation.

The states from the state model may then be used to manage subsequent activity of the data processing system. When a management components identifies an occurrence of the second state, the management component may log, display, flag, and/or otherwise take action based on a likelihood that the hardware components will likely not be successfully heated in the future. For example, when an occurrence of the second state is identified, the management component may notify management system 106 (which may take action to address the likelihood, such as scheduling a heater replacement, other servicing of the host data processing system, and/or take other action), change the operation of the data processing system (e.g., prevent it from shutting down which may cause the hardware component to cool and become inoperable due to its temperature), log the occurrence, and/or take other action to mitigate the impact of a heater failure.

By doing so, embodiments disclosed herein may provide a data processing system that is more likely to be able to provide desired computer implemented service by proactively identifying and/or mitigating the impact of heater failures, hardware component inoperability, and/or other issues even while various hardware components of the data processing system is inoperable.

Figure 2A:
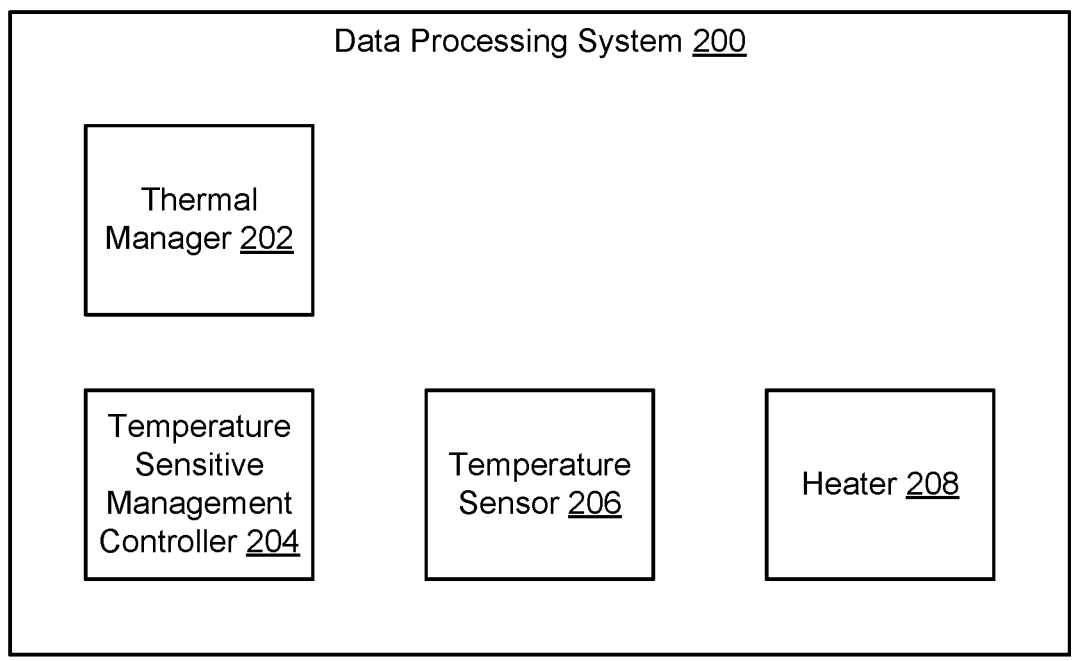
FIG. 2A shows a block diagram illustrating a data processing system in accordance with an embodiment.
Figure 2B:
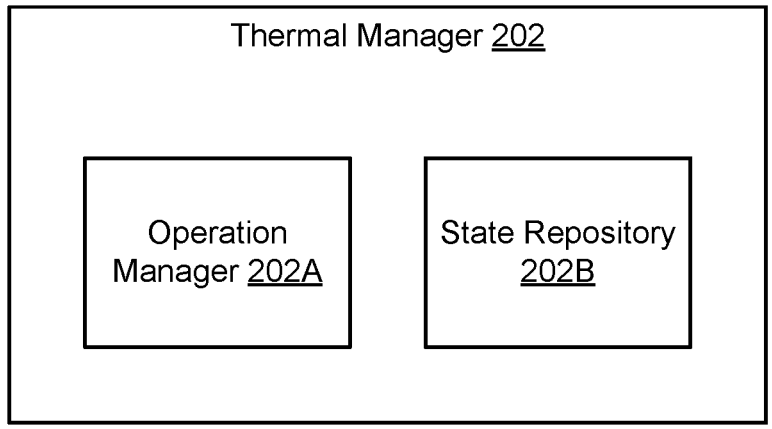
FIG. 2B shows a block diagram illustrating a thermal manager in accordance with an embodiment.
Figure 2C:
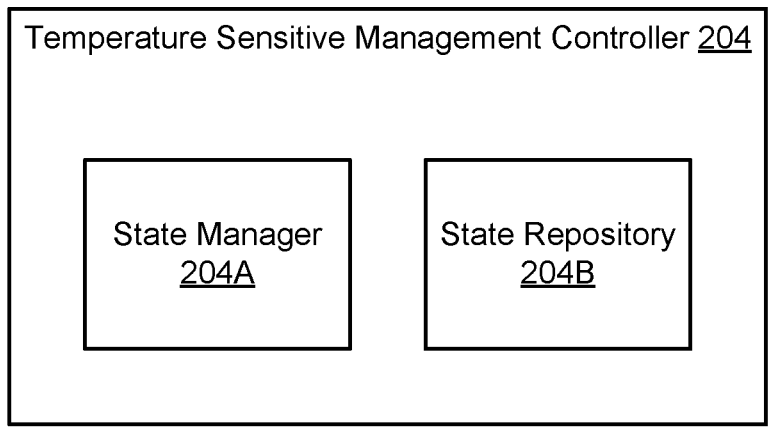
FIG. 2C shows a block diagram illustrating a temperature sensitive management controller in accordance with an embodiment.
Figure 3A:
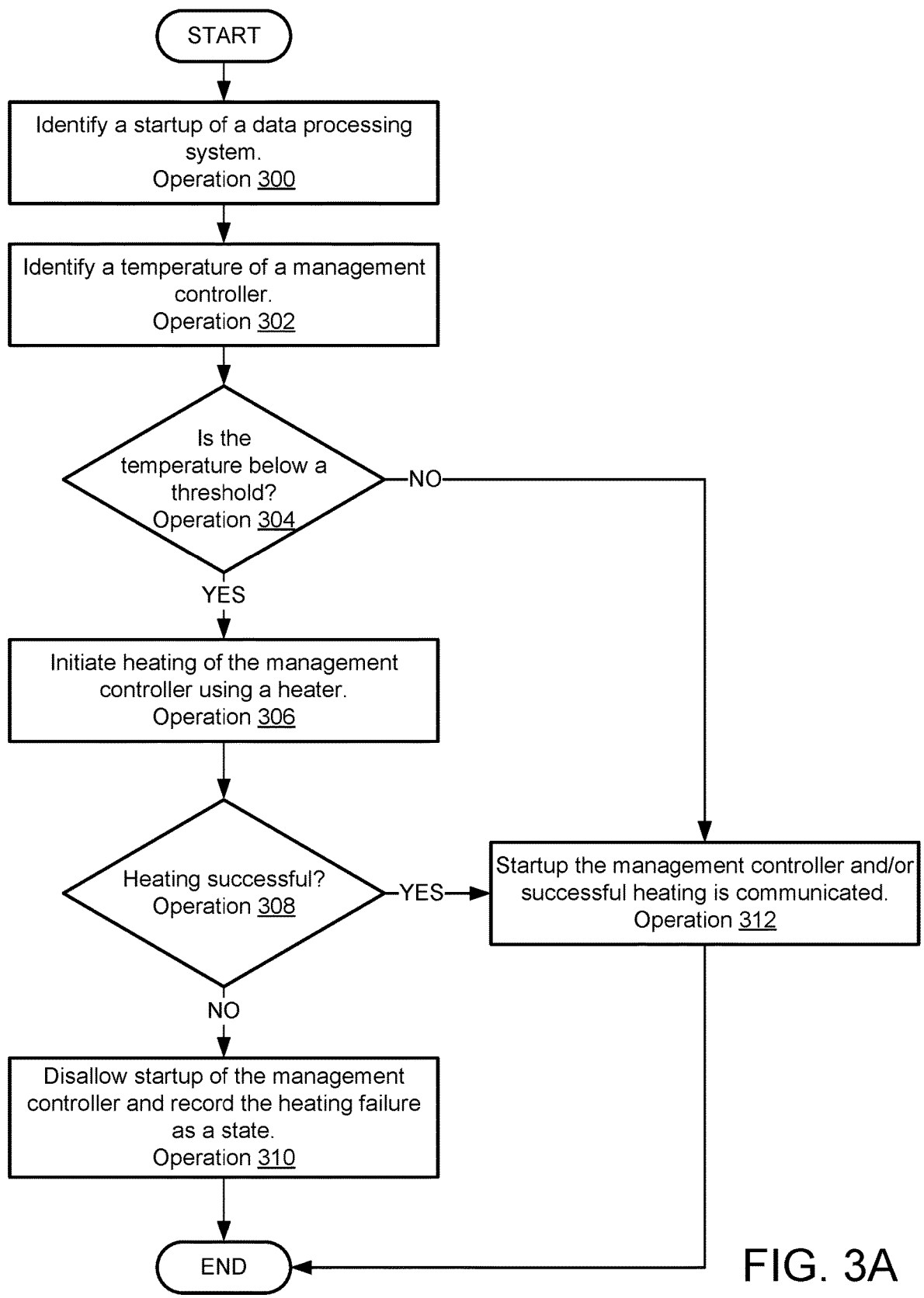
FIG. 3A shows a flow diagram illustrating a method of maintaining state and/or event information in accordance with an embodiment.
Figure 3B:
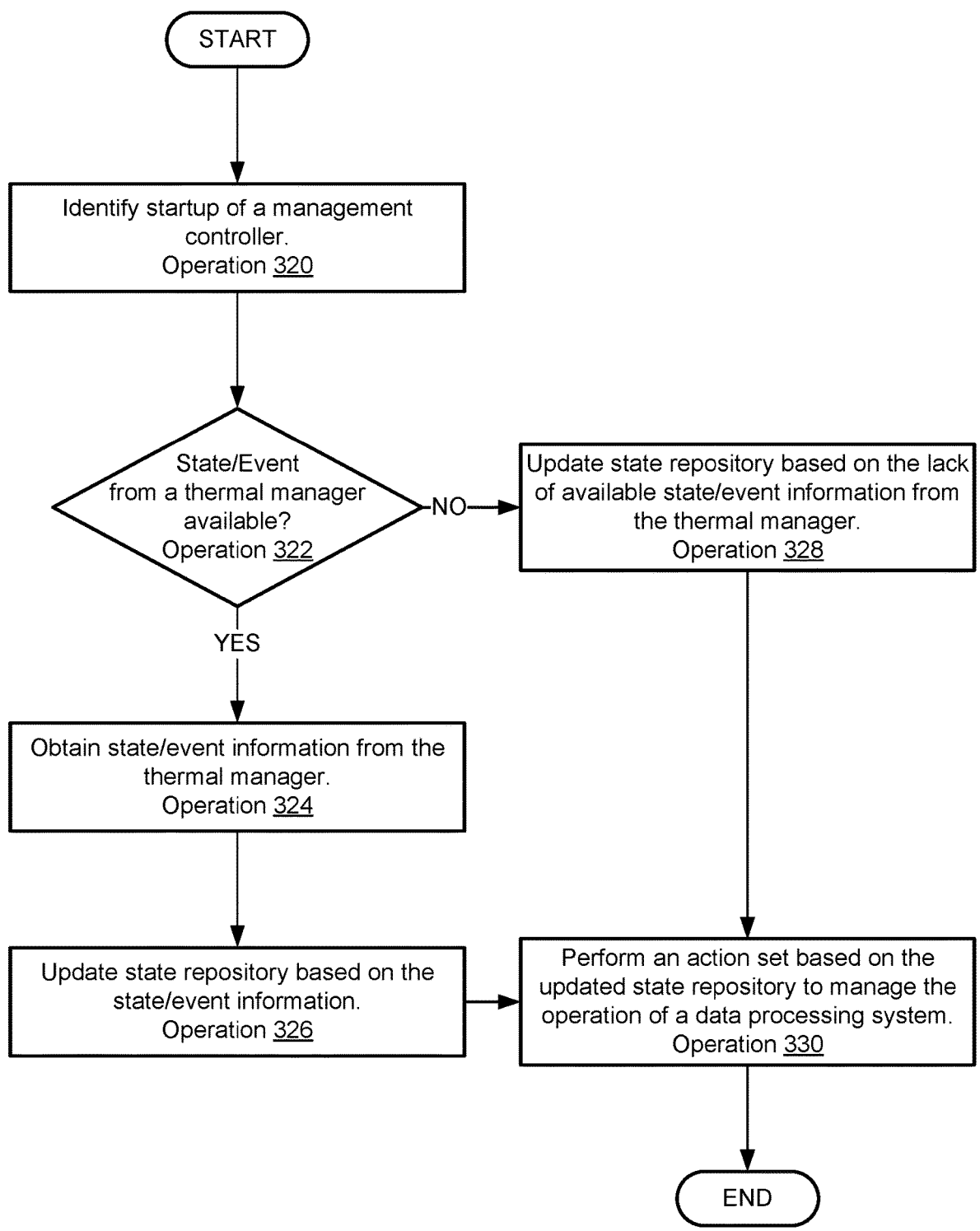
FIG. 3B shows a flow diagram illustrating a method of managing operation of a data processing system in accordance with an embodiment.

When providing their functionalities, any of data processing systems 100 may perform all, or a portion, of the methods illustrated in FIGS. 3A-3B. Refer to FIGS. 2A-2C for additional details regarding data processing systems.

Management system 106 may manage any of data processing systems 100. To manage data processing systems 100, management system 106 may (i) obtain information regarding the states of and/or events impacting various components of the data processing systems, (ii) identify, based on the obtained information, action that may improve the operation of data processing systems 100, and (iii) perform the identified action.

Any of data processing systems 100 and management system 106 may be implemented using a computing device such as a host or server, a personal computer (e.g., desktops, laptops, and tablets), a "thin" client, a personal digital assistant (PDA), a Web enabled appliance, a mobile phone (e.g., Smartphone), and/or any other type of computing device or system. For additional details regarding computing devices, refer to FIG. 4.

The system of FIG. 1 may include any number and types of data processing systems 100. Any of the aforementioned devices may operate independently and/or cooperatively to provide computer implemented services. Data processing systems 100 may provide such services to, for example, user of the data processing systems 100, to other data processing systems 100, and/or to other devices not shown in FIG. 1.

Data processing systems 100 may be operably connected to any of each other and/or other devices via communication system 108. Communication system 108 may include one or more networks that facilitate communication between data processing systems 100 (or portions thereof) and/or other devices. The networks may include, for example, wired networks, wireless network, public networks, private network, the Internet, etc.

While illustrated in FIG. 1 as included a limited number of specific components, a system in accordance with an embodiment may include fewer, additional, and/or different components than those illustrated therein.

Turning to FIG. 2A, a diagram of an example data processing system 200 in accordance with an embodiment is shown. Data processing system 200 may be similar to any of data processing systems 100.

Data processing system 200 may provide any number and type of computer implemented services. To provide the computer implemented services, data processing system 200 may include various hardware components (e.g., processors, memory modules, storage devices, etc.). To manage its own operation, data processing system 200 may include management components (e.g., hardware components) such as thermal manager 202, temperature sensitive management controller 204, temperature sensor 206, heater 208, and/or other components. Each of these management components is discussed as follows.

Generally, thermal manager 202 and temperature sensitive management controller 204 may cooperatively manage the operation of data processing system 200. For example, these management components may (i) manage the operation of heater 208, cooling components such as fans (not shown), and/or other components to maintain the temperatures of components of data processing system 200, (ii) monitor the operation of various hardware components (e.g., by monitoring states/events) of data processing system 200, (iii) cooperate with remote entity such as a remote control plane tasked with managing data processing system 200, and/or (iv) to perform other actions to manage the operation of data processing system 200.

Thermal manager 202 may be a temperature insensitive device that, in addition to other tasks, monitors the temperature of temperature sensitive management controller 204 and limits its operation until the temperature is within the thermal operating range of temperature sensitive management controller 204. For example, upon startup of data processing system 200, thermal manager 202 may not allow temperature sensitive management controller 204 to operate until its temperature has been verified (e.g., with temperature sensor 206) as being within the thermal operating range of temperature sensitive management controller 204.

Additionally, while temperature sensitive management controller 204 is not operating, thermal manager 202 may (i) attempt to warm it using heater 208, (ii) log information (e.g., state/event information) regarding its attempts to warm temperature sensitive management controller 204, and (iii) provide information to temperature sensitive management controller 204 regarding the attempts to warm it after temperature sensitive management controller 204 begins to operate.

When providing its functionality, thermal manager 202 may perform all or a portion of the methods shown in FIGS. 3A-3B. Refer to FIG. 2B for additional details regarding thermal manager 202.

Temperature sensitive management controller 204 may be tasked with managing data processing system 200 while it is operating. As part of managing data processing system 200, temperature sensitive management controller 204 may (i) obtain information regarding the operation of data processing system 200, (ii) provide all, or a portion, of the information to other entities, (iii) modify the operation of data processing system 200, (iv) maintain state and/or event information regarding the states of various hardware components of data processing system 200 and events impacting data processing system 200, and/or (v) based on the states and events, take action to reduce the risks associated with various hardware components that have demonstrated a propensity to fail to perform their functionalities. To maintain the state and/or event information, data processing system 200 may obtain information from thermal manager 202 to ascertain its and/or other components states and/or events impacting these hardware components during periods of time when temperature sensitive management controller 204 is inoperable.

For example, consider a scenario where data processing system 200 performs a startup while sufficient cold to reduce the temperature of temperature sensitive management controller 204 below its lowest temperature limit. Thermal manager 202 may, upon identifying the low temperature, may prevent temperature sensitive management controller from operating (e.g., by depriving it of power) and may active heater 208 to warm temperature sensitive thermal management controller 204. Thermal manager 202 may monitor the warming to ascertain whether heater 208 succeeded or failed. Thermal manager 202 may store state information reflective of the outcome of the heating attempt. At a later point in time when temperature sensitive management controller 204 warms sufficient to operate, temperature sensitive management controller 204 may retrieve the state from thermal manager 202 thereby providing temperature sensitive management controller 204 with information regarding the states of various hardware components (e.g., 204, 208) of data processing system 200 and/or events impacting the hardware components. Consequently, temperature sensitive management controller 204 may be empowered with a broader view into the operation of data processing system 200 even while it is not operating. Accordingly, temperature sensitive management controller 204 may make better management decisions that better align with the actual operating condition of data processing system 200.

For example, if heater 208 failed to warm temperature sensitive management controller 204, then temperature sensitive management controller 204 may take proactive action to reduce the impact of future failures of heater 208. By doing so, the uptime of data processing system 200 and/or components therein may be improved.

When providing its functionality, temperature sensitive management controller 204 may perform all or a portion of the methods shown in FIGS. 3A-3B. Refer to FIG. 2C for additional details regarding temperature sensitive management controller 204.

In an embodiment, one or more of thermal manager 202 and temperature sensitive management controller 204 is implemented using a hardware device including circuitry. The hardware device may be, for example, a digital signal processor, a field programmable gate array, or an application specific integrated circuit. The circuitry may be adapted to cause the hardware device to perform the functionality of thermal manager 202 and/or temperature sensitive management controller 204. Thermal manager 202 and/or temperature sensitive management controller 204 may be implemented using other types of hardware devices without departing embodiment disclosed herein.

In an embodiment, one or more of thermal manager 202 and temperature sensitive management controller 204 is implemented using a processor adapted to execute computing code stored on a persistent storage that when executed by the processor performs the functionality of thermal manager 202 and/or temperature sensitive management controller 204 discussed throughout this application. The processor may be a hardware processor including circuitry such as, for example, a central processing unit, a processing core, or a microcontroller. The processor may be other types of hardware devices for processing information without departing embodiment disclosed herein.

Temperature sensor 206 may monitor (e.g., directly or indirectly) the temperature of temperature sensitive management controller 204 and provide information regarding the temperature to other components. Temperature sensor may be implemented with, for example, a thermocouple or other temperature measurement component.

Heater 208 may selectively heat temperature sensitive management controller 204 when instructed to do so by thermal manager 202 and/or other components. Heater 208 may be implemented with, for example, a resistive heater and/or a power supply. The power supply and/or resistive heater may be controller by thermal manager 202 and/or other components.

While illustrated in FIG. 2A with a limited number of specific components, a data processing system may include additional, fewer, and/or different components without departing from embodiments disclosed herein.

Turning to FIG. 2B, a diagram of thermal manager 202 in accordance with an embodiment is shown. As noted above, thermal manager 202 may manage the operation of a data processing system in cooperation with temperature sensitive management controller 204. To manage the operation of the data processing system, thermal manager 202 may include operation manager 202A and state repository 202B. Each of these components is discussed below.

Operation manager 202A may manage portions of the operations of the data processing system. For example, operation manager 202A may (i) monitor the operation, states of, and/or events impacting hardware components, (ii) store the monitored events and/or states (and/or information derived from the states/events) in state repository 202B, (iii) initiate action by various hardware components of the data processing system, and/or (iv) provide information regarding the stored monitored events and/or states (e.g., to a temperature sensitive management controller 204).

For example, operation manager 202A may track the state of a temperature sensitive management controller using the state model. When warming of the temperature sensitive management controller is needed and successful, then thermal manager 202 may store a state of 'past successful heating occurred'. When warming of the temperature sensitive management controller is needed but unsuccessful, then thermal manager 202 may store a state of 'past failed/aborted heating occurred'. When no warming is needed, no state may be stored for the temperature sensitive management controller. By doing so, thermal manager 202 may notify the temperature sensitive management controller of information relevant to managing the operation of data processing system 200.

Thermal manager 202 may be implemented using, for example, a programmable logic device. In comparison to temperature sensitive management controller 204, thermal manager 202 may be more limited in functionality (e.g., unable to implement complex control algorithms), but may be less (and/or insensitive) sensitive to temperature. Consequently, thermal manager 202 may be tasked with placing temperature sensitive management controller 204 in condition for operation prior to its operation (e.g., by preventing powering of temperature sensitive management controller 204, and/or via other control mechanisms).

State repository 202B may be implemented with one or more data structures in which information regarding the states of and/or events impacting hardware components of a data processing system is stored. State repository 202B may include any quantity and type of information, and may be implemented with any types of data structures (e.g., lists, tables, databases, linked lists, etc.).

While illustrated in FIG. 2B with a limited number of specific components, a thermal manager may include additional, fewer, and/or different components without departing from embodiments disclosed herein.

Turning to FIG. 2C, a diagram of temperature sensitive management controller 204 in accordance with an embodiment is shown. As noted above, temperature sensitive management controller 204 may manage the operation of a data processing system in cooperation with thermal manager 202. To manage the operation of the data processing system, temperature sensitive management controller 204 may include state manager 204A and state repository 204B. Each of these components is discussed below.

State manager 204A may assist in managing portions of the operations of the data processing system. To do so, state manager 204A may identify past and/or present states of temperature sensitive management controller 204, use the past and/or present states to determine how to manage a host data processing system, and/or to perform other actions. To identify past and/or present state of temperature sensitive management controller 204, state manager 204A may cooperate with operation manager 202A of thermal manager 202. For example, after state manager 204A begins to operate, state manager 204A may obtain state information from thermal manager 202. The state information may indicate which state(s) are to be ascribed to temperature sensitive management controller 204 while temperature sensitive management controller 204 was previously inoperable. As noted above, temperature sensitive management controller 204 may be inoperable due to thermal conditions. Consequently, temperature sensitive management controller 204 may rely on thermal manager 202 to provide it with state information reflecting whether and to what extent attempts to warm temperature sensitive management controller 204 were successful.

Once obtained, the information may be stored in state repository 204B to provide temperature sensitive management controller 204 with a more complete view of the operation of temperature sensitive management controller 204 over time. Using the information, temperature sensitive management controller 204 may perform various operations to reduce the impact of heating failures on the host data processing system, as noted above.

Temperature sensitive management controller 204 may be implemented using, for example, an out of band management controller, an in band management controller, and/or other types of computing devices that may be hosted by but operate separately from a data processing system. In comparison to thermal manager 202, temperature sensitive management controller 204 may be broader in functionality (e.g., able to implement complex control algorithms), but may be more sensitive to temperature. Consequently, temperature sensitive management controller 204 may be inactive during various periods of time depending on the temperature of the ambient environment.

State repository 204B may be implemented with one or more data structures in which information regarding the states of and/or events impacting hardware components of a data processing system is stored. State repository 204B may include any quantity and type of information, and may be implemented with any types of data structures (e.g., lists, tables, databases, linked lists, etc.).

While illustrated in FIG. 2C with a limited number of specific components, a thermal manager may include additional, fewer, and/or different components without departing from embodiments disclosed herein.

While the functionality of thermal manager 202 and temperature sensitive management controller 204 have been described with respect to example functionalities, it will be appreciated that any of these management components may include additional, different, and/or less functionality without departing from embodiments disclosed herein. For example, any of these management components may include functionality to (i) calculate and implement airflow (e.g., using fans) and/or heating (e.g., using heater(s)) to thermally manage hardware components, (ii) monitor and store information relevant to the likelihood of heaters and/or other thermal management components being operational in the future, (iii) communicate/cooperate with external devices (e.g., control planes) to coordinate operation within a larger framework of data processing systems, and/or (iv) perform other types of functionalities relevant to providing computer implemented services using data processing systems.

As discussed above, the components of FIG. 1 may perform various methods to increase the likelihood of data processing systems being able to provide computer implemented services. FIGS. 3A-3B illustrate examples of methods that may be performed by the components of FIG. 1. In the diagrams discussed below and shown in these figures, any of the operations may be repeated, performed in different orders, and/or performed in parallel with or a partially overlapping in time manner with other operations.

Turning to FIG. 3A, a flow diagram illustrating a method of managing operation of a temperature sensitive management controller in accordance with an embodiment is shown. The method may be performed, for example, by a data processing system, a thermal manager, and/or other components illustrated in FIGS. 1-2C.

At operation 300, a startup of the data processing system is identified. The startup may be identified, for example, monitoring for the data processing system being powered on, restarted, or otherwise initiating performance of the startup.

At operation 302, a temperature of a management controller is identified. The temperature may be identified by measuring the temperature using a sensor, receiving information regarding the temperature from another entity, reading information regarding the temperature from memory and/or storage, and/or via other methods. The temperature may be identified prior to operation of the management controller during the startup.

At operation 304, a determination is made regarding whether the temperature is below a threshold. The determination may be made by comparing the temperature to the threshold. The threshold may be, for example, a lower temperature limit (and/or other type of limit) for the management controller. If the comparison indicates that the temperature is below the lower temperature limit, then it may be determined that the temperature is below the threshold.

If temperature is below the threshold, then method may proceed to operation 306 following operation 304. If the is not below the threshold, then the method may proceed to operation 312 following operation 304.

At operation 306, heating of the management controller is initiated using a heater. The heating may be initiated by, for example, providing power to the heater. The power may be provided using a power supply and/or a power management component (which may be separate from or part of the heater) that manages power delivery to the heater. The power may be provided by sending instructions or otherwise communicating with the power supply and/or the power manager component.

In an embodiment, initiating heating of the management controller does not result in warming of the management controller when the heater (and/or other components such as the power management component) malfunctions or otherwise does not operate as expected. Thus, the management controller may or may not be warmed during and/or following operation 306.

At operation 308, a determination is made regarding whether the heating is successful. The determination may be made by (i) monitoring a temperature of the management controller and (ii) comparing the temperature of the management controller (e.g., during a period of time where the heating should warm the management controller if the heating is successful) to the threshold. If the temperature of the management controller raises above the threshold, then the heating may be considered to be successful. Otherwise, the heating may be considered to be unsuccessful.

If the heating is successful, then the method may proceed to operation 312 following operation 308. If the heating is unsuccessful, then the method may proceed to operation 310.

At operation 310, startup of the management controller is disallowed, and the heating failure is recorded as a state/event for the management controller. Startup of the management controller may be disallowed by preventing the management controller from being powered. The heating failure may be recorded by archiving state/event information reflecting the heating failure (e.g., a 'past failed/aborted heating occurred' state/event). The state/event information may be archived by storing it in storage (e.g., persistent storage) and/or memory. The state/event information may be used to provide the management controller with information regarding it after the management controller begins to operate. Refer to FIG. 3B for additional details regarding use of state/event information The method may end following operation 310.

Returning to operations 304 and 308, the method may proceed to operation 312 following operation 304 when the temperature is above the threshold and operation 308 when the heating is successful.

At operation 312, operation of the management controller is initiated and/or successful heating of the management controller is communicated. The operation of the management controller may be initiated by powering the management controller and/or performing other types of actions that may initiate operation of the management controller. The successful heating of the management controller may be communicated only when heating of the management controller was initiated (e.g., operation 306), and may not be communicated when the temperature of the management controller was above the threshold and heating of the management controller was not initiated (e.g., the NO path following operation 304). The successful heating of the management controller may be communicated by (i) archiving state/event information reflecting the successful heating (which may be later obtained by the management controller once it is operating), (ii) directly communicating the state/event information without archiving it, and/or (iii) via other methods. The state/event information may reflect a 'past successful heating occurred' state/event.

The method may end following operation 312.

Using the method illustrated in FIG. 3A, a data processing system in accordance with embodiments disclosed herein may improve the likelihood that its management components are aware of the states of and/or events impacting the management components even while some of the management components are inoperable. Consequently, the management components may be better able to make management decisions with respect to how to manage the operation of the data processing system.

Turning to FIG. 3B, a flow diagram illustrating a method of managing operation of a data processing system in accordance with an embodiment is shown. The method may be performed, for example, by a data processing system, a management controller, and/or other components illustrated in FIGS. 1-2C.

At operation 320, a startup of a management controller is identified. The startup may be identified, for example, monitoring for the management controller being powered on, restarted, or otherwise initiating performance of the startup.

At operation 322, a determination is made regarding whether a state/event is available from a thermal manager. The determination may be made by communicating with the thermal manager. The thermal manager may, if a state/event is available, provide state/event information. If state/event information is provided, then it may be determined that the state/event is available from the thermal manager.

If it is determined that the state/event is available from the thermal manager, then the method may proceed to operation 324. If the state/event is not available from the thermal manager, then the method may proceed to operation 328.

At operation 324, state/event information is obtained from the thermal manager. The state/event information may be obtained by receiving the state/event information directly, or indirectly, from the thermal manager. The state/event information may include information regarding a state of and/or event impacting a management controller while the management controller was not operating.

At operation 326, a state repository is updated based on the state/event information. The state repository may be updated by adding information to it based on the state/event information. The information added to the state repository may take any form (e.g., may be based on an encoding scheme, may be plain text, etc.).

For example, in a scenario in which the state/event information indicates that attempted heating of the management controller was unsuccessful, then information indicating that a heating failure in the future is likely to occur may be added to the repository. In another example, in a scenario in which the state/event information indicates that attempted heating of the management controller was successful, then information indicating that a heating failure in the future is unlikely to occur.

At operation 330, an action set based on the updated state repository is performed to manage the operation of the data processing system. When the updated state repository indicates that a heating failure is likely to occur in the future, the action set may include, for example, (i) sending notifications regarding the likelihood of failure to other entities, (ii) placing the data processing system in an operating state to reduce the likelihood of need for heating of the management controller, (iii) attempting to repair the heating failure and/or initiating repair of the heating failure, and/or (iv) any other types of actions that may reduce a likelihood of the data processing system being undesirably impacted by a future heating failure.

When the updated state repository indicates that a heating failure is unlikely to occur in the future, the action set may include, for example, (i) sending notifications regarding the low likelihood of failure to other entities, (ii) placing the data processing system into a nominal operating state (which may allow for situations in which heating of the management controller may be required), and/or (iii) other actions to manage the operation of data processing system in accordance with the belief that future heating of the management controller will be successful.

The method may end following operation 330.

Returning to operation 322, the method may proceed to operation 328 following operation 322 when it is determined that no state/events from the thermal manager are available.

At operation 328, the state repository is updated based on the lack of available state/event information from the thermal manager. The state repository may be updated by adding information to it based on the lack of state/event information. The information added to the state repository may take any form (e.g., may be based on an encoding scheme, may be plain text, etc.).

For example, information indicating that no heating was needed during a most recent startup of the data processing system and/or management controller may be added to the state repository.

The method may proceed to operation 330, following operation 328.

Using the method illustrated in FIG. 3B, a data processing system may manage its operating using a consistent view of the operation of its hardware components even while some of the hardware components are not operating. Consequently, the data processing system may be better able to proactively address operational challenges such as, for example, likely failures of heaters in the future that may impact (e.g., impair, prevent, etc.) the future operation of the data processing system.

Figure 4:
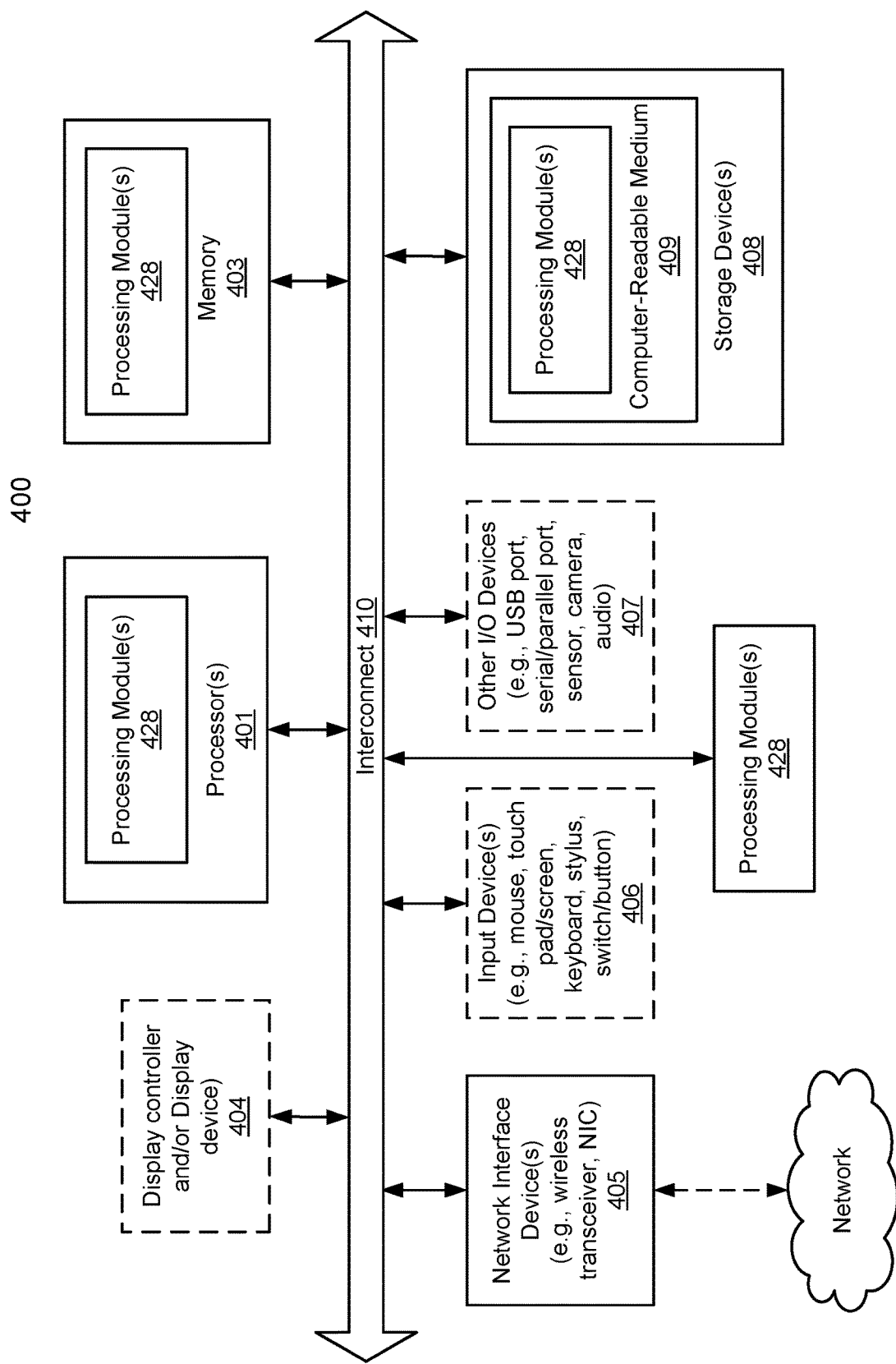
FIG. 4 shows a block diagram illustrating a computing device in accordance with an embodiment.

Any of the components illustrated in FIGS. 1-2C may be implemented with one or more computing devices. Turning to FIG. 4, a block diagram illustrating an example of a computing device in accordance with an embodiment is shown. For example, system 400 may represent any of the data processing systems and/or computing devices described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A data processing system that provides computer implemented services while operating, the data processing system comprising:
　a temperature sensitive management controller to manage the data processing system, the temperature sensitive management controller having a thermal operating range having a lower temperature limit;
　a heater positioned to selectively warm the temperature sensitive management controller;
　a temperature sensor positioned to monitor a temperature of the temperature sensitive management controller; and
　a thermal manager adapted to:
　　limit operation of the temperature sensitive management controller based on the lower temperature limit; and
　　while limiting the operation, provide state tracking services for the temperature sensitive management controller.

2. The data processing system of claim 1, wherein limiting the operation and providing the state tracking services comprises:
　identifying a startup of the data processing system;
　identifying, using the temperature sensor, the temperature of the temperature sensitive management controller during the startup;
　making a first determination regarding whether the temperature is below the lower temperature limit;
　in a first instance of the first determination where the temperature is below the lower temperature limit:
　　initiating, using the heater, the selective warming of the temperature sensitive management controller; and
　　making a second determination regarding whether the selective warming increased the temperature of the temperature sensitive management controller above the lower temperature limit.

3. The data processing system of claim 2, wherein limiting the operation and providing the state tracking services further comprises:
　in a first instance of the second determination where the temperature of the temperature sensitive management controller is increased above the lower temperature limit:
　　initiating operation of the temperature sensitive management controller during the startup.

4. The data processing system of claim 3, wherein limiting the operation and providing the state tracking services further comprises:
　in a second instance of the second determination where the temperature of the temperature sensitive management controller is not increased above the lower temperature limit:
　　disallowing operation of the temperature sensitive management controller during the startup; and
　　recording a heating failure state for the management controller.

5. The data processing system of claim 4, wherein limiting the operation and providing the state tracking services further comprises:
　in a second instance of the first determination where the temperature is above the lower temperature limit:
　　initiate operation of the temperature sensitive management controller during the startup.

6. The data processing system of claim 5, wherein the temperature sensitive management controller is adapted to, after initiating operation, communicate with the thermal manager to identify whether a failure of the heater occurred prior to the temperature sensitive management controller initiating operation, and in an instance of the communication where the temperature sensitive management controller identifies that the failure of the heater occurred: establish a log entry based on the failure of the heater that occurred.

7. The data processing system of claim 1, wherein the thermal manager is adapted to operate at temperatures lower than the lower temperature limit.

8. The data processing system of claim 7, wherein the thermal manager is further adapted to automatically begin to operate when the data processing system performs a startup, and the temperature sensitive management controller is restricted from beginning to operate unless directed to operate by the thermal manager.

9. The data processing system of claim 1, wherein the temperature sensitive management controller is adapted to operate based on a state model, and the state model comprising a state that is based on inoperability of temperature sensitive management controller.

10. The data processing system of claim 9, wherein the state is further based on a failure of the heater to warm the temperature sensitive management controller.

11. A computer-implemented method for providing computer implemented services with a data processing system while the data processing system is operating, the method comprising:
　limiting, by a thermal manager of the data processing system, operation of a temperature sensitive management controller of the data processing system based on a lower temperature limit for the temperature sensitive management controller, the thermal manager limiting the operation in by party by using a temperature sensor positioned to monitor a temperature of the temperature sensitive management controller, and the operation being limited until a heater positioned to selectively sensitive management controller above the lower temperature limit;
　while limiting the operation, provide state tracking services for the temperature sensitive management controller; and
　after limiting the operation of the temperature sensitive management controller, managing the operation of the temperature sensitive management controller based on a state reported to the temperature sensitive management controller through the state tracking services.

12. The computer-implemented method of claim 11, wherein limiting the operation and providing the state tracking services comprises:
　identifying a startup of the data processing system;
　identifying, using the temperature sensor, the temperature of the temperature sensitive management controller during the startup;
　making a first determination regarding whether the temperature is below the lower temperature limit;
　in a first instance of the first determination where the temperature is below the lower temperature limit:

initiating, using the heater, the selective warming of the temperature sensitive management controller; and making a second determination regarding whether the selective warming increased the temperature of the temperature sensitive management controller above the lower temperature limit.

13. The computer-implemented method of claim 12, wherein limiting the operation and providing the state tracking services further comprises:

in a first instance of the second determination where the temperature of the temperature sensitive management controller is increased above the lower temperature limit:

initiating operation of the temperature sensitive management controller during the startup.

14. The computer-implemented method of claim 13, wherein limiting the operation and providing the state tracking services further comprises:

in a second instance of the second determination where the temperature of the temperature sensitive management controller is not increased above the lower temperature limit:

disallowing operation of the temperature sensitive management controller during the startup; and recording a heating failure state for the management controller.

15. The computer-implemented method of claim 14, wherein limiting the operation and providing the state tracking services further comprises:

in a second instance of the first determination where the temperature is above the lower temperature limit:

initiate operation of the temperature sensitive management controller during the startup.

16. A non-transitory machine-readable medium having instructions stored therein, which when executed by a processor, cause a data processing system to perform operations for providing computer implemented services with a data processing system while the data processing system is operating, the operations comprising:

limiting, by a thermal manager of the data processing system, operation of a temperature sensitive management controller of the data processing system based on a lower temperature limit for the temperature sensitive management controller, the thermal manager limiting the operation in by party by using a temperature sensor positioned to monitor a temperature of the temperature sensitive management controller, and the operation being limited until a heater positioned to selectively sensitive management controller above the lower temperature limit;

while limiting the operation, provide state tracking services for the temperature sensitive management controller; and after limiting the operation of the temperature sensitive management controller, managing the operation of the temperature sensitive management controller based on a state reported to the temperature sensitive management controller through the state tracking services.

17. The non-transitory machine-readable medium of claim 16, wherein limiting the operation and providing the state tracking services comprises:

identifying a startup of the data processing system;

identifying, using the temperature sensor, the temperature of the temperature sensitive management controller during the startup;

making a first determination regarding whether the temperature is below the lower temperature limit;

in a first instance of the first determination where the temperature is below the lower temperature limit:

initiating, using the heater, the selective warming of the temperature sensitive management controller; and making a second determination regarding whether the selective warming increased the temperature of the temperature sensitive management controller above the lower temperature limit.

18. The non-transitory machine-readable medium of claim 17, wherein limiting the operation and providing the state tracking services further comprises:

in a first instance of the second determination where the temperature of the temperature sensitive management controller is increased above the lower temperature limit:

initiating operation of the temperature sensitive management controller during the startup.

19. The non-transitory machine-readable medium of claim 18, wherein limiting the operation and providing the state tracking services further comprises:

in a second instance of the second determination where the temperature of the temperature sensitive management controller is not increased above the lower temperature limit:

disallowing operation of the temperature sensitive management controller during the startup; and recording a heating failure state for the management controller.

20. The non-transitory machine-readable medium of claim 19, wherein limiting the operation and providing the state tracking services further comprises:

in a second instance of the first determination where the temperature is above the lower temperature limit:

initiate operation of the temperature sensitive management controller during the startup.

\* \* \* \* \*